US012382887B2

(12) United States Patent
Barao et al.

(10) Patent No.: US 12,382,887 B2
(45) Date of Patent: Aug. 12, 2025

(54) ROOT GROWTH OPTIMIZATION METHOD

(71) Applicant: Local Bounti Operating Company LLC, Hamilton, MT (US)

(72) Inventors: Andrew Barao, Hamilton, MT (US); Travis M. Joyner, Hamilton, MT (US); Jeffrey Leggott, Hamilton, MT (US); Drew Myers, Stevensville, MT (US); Seth Swanson, Missoula, MT (US); Ryan Sweeney, Hamilton, MT (US)

(73) Assignee: Local Bounti Operating Company LLC, Hamilton, MT (US)

( * ) Notice: Subject to any disclaimer, the term of this patent is extended or adjusted under 35 U.S.C. 154(b) by 876 days.

(21) Appl. No.: 17/545,615

(22) Filed: Dec. 8, 2021

(65) Prior Publication Data
US 2023/0172128 A1    Jun. 8, 2023

(51) Int. Cl.
| *A01G 31/06* | (2006.01) |
| *A01G 31/00* | (2018.01) |
| *A01G 31/02* | (2006.01) |
| *G05B 13/02* | (2006.01) |

(52) U.S. Cl.
CPC ......... *A01G 31/06* (2013.01); *G05B 13/0265* (2013.01)

(58) Field of Classification Search
CPC ......... A01G 31/06; A01G 31/00; A01G 31/02
See application file for complete search history.

(56) References Cited

U.S. PATENT DOCUMENTS

| 11,452,266 | B2* | 9/2022 | Ramirez | A01G 27/06 |
| 12,245,555 | B2* | 3/2025 | Joyner | A01G 31/06 |
| 2006/0218862 | A1 | 10/2006 | Dyas | |
| 2017/0105373 | A1 | 4/2017 | Byron, III et al. | |
| 2019/0246559 | A1* | 8/2019 | Hsueh | A01C 23/047 |
| 2020/0367455 | A1 | 11/2020 | Vesty | |
| 2021/0259160 | A1* | 8/2021 | Marder-Eppstein | A01G 25/16 |
| 2021/0267147 | A1* | 9/2021 | Filippov | A01G 24/44 |
| 2022/0377994 | A1* | 12/2022 | Stubblefield | A01G 31/02 |

OTHER PUBLICATIONS

International Search Report and Written Opinion issued on Mar. 1, 2023, in corresponding International Application No. PCT/US2022/051640, 7 pages.

* cited by examiner

*Primary Examiner* — Kristen C Hayes
(74) *Attorney, Agent, or Firm* — Maier & Maier, PLLC

(57) ABSTRACT

A farming method may be shown and described. In an exemplary embodiment, plants may begin in a germination phase. Next, plants are brought to a nursery for a period of time before optionally being transplanted to one or more subsequent nurseries. Plants in the nurseries may be stacked vertically in trays. During the nursery phase, root growth may be optimized. Finally, plants are transplanted to a greenhouse where they may grow until they are ready for harvest. In an exemplary embodiment, the nursery phases may be vertical farms while the greenhouse phase may be a traditional, hydroponic, or other type of farm which may receive sunlight. AI may be implemented to optimize environmental conditions and robotics may be used to harvest the plants.

12 Claims, 11 Drawing Sheets

ROOT GROWTH OPTIMIZATION METHOD

FIELD

An exemplary embodiment relates to the field of farming.

BACKGROUND

Conventional agriculture presents a number of problems. Large areas of space and large amounts of water are typically required. The advent of Controlled Environment Agriculture (CEA) has addressed these problems. Hydroponic CEA can reduce water usage and land by more than 90%. Further, this allows for a 365-day growing season. CEA has a significantly smaller footprint with a significantly higher yield compared to conventional agriculture. The use of a controlled environment, where factors such as light, space optimization, and other environmental conditions can be precisely specified, allows for such improvements. In addition, there is a risk of crop failure and a high risk of disease and virus outbreak, CEA farms control the environment to minimize and even eliminate pests and diseases from entering the growing spaces.

However, CEA still faces a number of challenges; they may require higher capital expenditures and operational expenses. Traditional indoor farms plant seedlings at low densities in order to allow them to grow with a proper amount of space. As a result, there is a large amount of unused "white-space" that is only occupied when the plant reaches maturity. To maximize efficiency, some CEA farm facilities may implement vertical farming, where crops are grown in vertically stacked layers. In vertical farms, LED lights substitute natural light in these densely packed farms. Vertical farming produces a high yield per square foot while also requiring less water due to implementation of hydroponic farming techniques. However, vertical farms still face challenges such as a high risk of crop failure, low product flexibility, and a heavy mechanical dependence leading to high capital and operational costs to build and operate. Further, CEA vertical farms face unique difficulties associated with the heating, cooling, and dehumidification because of the complete reliance on supplementary lighting and an artificial environment, leading to elevated capital and operating costs. Because of the high operational costs, reducing and optimizing the duration of the growing cycle(s) is critical to production costs and product quality.

SUMMARY

According to at least one exemplary embodiment, a method, and system for optimizing a farm may be shown and described.

A system and method for farming crops or plants by planting seeds or seedlings and growing the seeds or seedlings into plants in a germination phase; stacking plants throughout a nursery in one or more nursery phases. In some exemplary embodiments, plants may be arranged vertically stacked and receive light from artificial light sources in each nursery phase. The plants may reside on a tray with an open and enclosed bottom, such that the plant plug and roots are suspended above and grow and reach into the water or nutrients below.

In an exemplary embodiment, sensors may measure plant size, root growth and density. Plant density may refer to the spacing between the plants; as the plants grow larger, the plant may become less densely arranged. When plants reach a predetermined size, root length or density, or when a space between the plants is reduced beyond a predetermined threshold, the plants in the stack may be transferred to a subsequent stack phase. The root length may be measured, monitored, and optimized in order to expedite the growth of the plants. The subsequent stack phase may hold the plants in a configuration where the plants are spaced at a lower density configuration. For example, if the plants are cultivated on a tray in a first stack phase, the tray in the second stack phase may be configured to hold fewer plants in the same area, therefore allowing the plants additional lateral space for expanded growth and development.

The plants in one or more of the nurseries may further include a space between the plant plug and the nutrients or water below. The spacing may be created or adjusted by the water level, depth of the plant plug, depth of water table, a custom drain/flush/fill cycle, or the plant tray design, or by pairings of any of the above. (For example, in an exemplary embodiment, a given tray design may be paired with a given plant cultural practice in order to better modify root growth to improve transplant success and reduce overall production time.) The roots of the plant may be further encouraged to grow towards the spaced away water, based for example on the above exemplary spacing adjustments or based on cultural practices paired with those spacing adjustments. On these grounds, transplanting a hanging shallow plug into an enclosed deep tray cavity may promote root extension beyond the substrate rhizosphere, without such growth being significantly impaired by air pruning, and thus the growth of the roots may be optimized for transplant and expedited in this stack phase in one or more vertical or nursery phases.

(For reference, in traditional transplant techniques for soil farming, it is often necessary to prune the roots of a plant in order to promote proper growth, for example to avoid having the plants become "pot-bound" and develop a root structure with tightly twisting circular roots based on the constricted space available in an earliest pot. Typically, the roots of a plant cannot be accessed as it grows, meaning that the roots must be pruned at the time that the plant has been transplanted, often involving cutting back around a third of the root ball all at once and reorienting the root structure to the extent possible. These traditional techniques often result in transplant shock, sometimes with a level of severity that is fatal to the plant, and so air pruning has developed as an alternative. In contemporary air pruning techniques, the roots are allowed to come into contact with air as they grow, in a manner that causes the individual root tip to dry out and stop growing, which in turn causes the plant to respond to this by creating a higher density of fibrous lateral roots. Air pruning, in comparison to traditional root pruning techniques, does reduce transplant shock and help eliminate circling roots or other inefficient root structures, but also, by necessity, impairs root extension.)

After the stack phase, the method may continue with transplanting the plants to a greenhouse, where the plants in the greenhouse may be horizontally arranged in a greenhouse phase, and where, during the greenhouse phase, the plants receive natural sunlight and nutrients. In an exemplary embodiment, in a greenhouse phase, the root of the plants may be directly placed in contact with water and nutrients. Due to the use of the greenhouse, a lag time which results from a difference in time from when the plants are put into the pond and the time in which the active portions of the roots are in water may be eliminated, accelerating growth and reducing the crop cycle. While some rafts may be designed to keep the substrate off the water for several days in order to reduce hypoxic conditions in the root zone, an exemplary embodiment may instead allow the plant substrate or roots to directly contact the water on the first day. By allowing the plant roots to contact the water immediately, daily biomass accumulation is expedited, as compared to embodiments where the substrate is kept off the water which may result in a slower daily biomass accumulation until the roots can expand and elongate.

Plants with longer roots may develop to maturity faster in the greenhouse phase because a larger root mass allows the plant access to more nutrients. Thus, by optimizing the length of the roots in the different vertical nurseries stages in the stack phase, the time the plants spend in the greenhouse phase (and ultimately, the entire time it takes for the plant to reach maturity from a seedling) may be reduced. The plants may be harvested from the greenhouse at a sooner time, and thus more crops can be planted and harvested per year as compared to traditional methods while still achieving an equal or greater size (or number of units) per plant. The total annual yield per area of an exemplary facility may thus be increased compared to traditional methods.

A control unit, which may in some exemplary embodiments be a computer or set of computers that is configured to measure plant parameters and alter the plant environment via associated sensors and effectors, or another such processing device or set of processing devices such as a set of microcontrollers that is configured to do likewise, may alter multiple plant or environmental parameters during the germination phase, the one or more stack phases and the greenhouse phase. The control unit may specifically be configured to adjust the plant parameters differently according to requirements of each of the germination phase, nursery phase(s), and greenhouse phase. For example, the control unit may measure root length, and may move the plants to a subsequent nursery or to a greenhouse based on the length of the roots. Sensors and switches may be operated by the control unit in order to perform the appropriate measurements and adjustments. A camera, for example, may be connected to the control unit and used to measure the root length. One or more robotic mechanisms may be operated by the control unit to move plants in the phases. The control unit may implement machine learning and artificial intelligence, and may be a cloud based system.

A hydroponic farm may be implemented in one or more phases. Further, stacked vertical and horizontal farming configurations may be implemented. For example, a nursery phase may include hydroponic plant trays vertically arranged on shelves, which may receive artificial light. The greenhouse phase may include hydroponic plant rafts which are horizontally arranged and may receive natural sunlight and could be further augmented by supplementary lighting.

Optionally, some plants may be transplanted to one or more subsequent phases or environments with different plant density and duration or residence time in the nurseries or greenhouses. Some or all of the plants from a first nursery may be transplanted to one or more subsequent nurseries. The size and environmental conditions of the initial and subsequent nurseries may vary to accommodate the change in density, duration, and objectives of plant growth.

Environmental conditions, cultural practices, physical space, time, and operating cost can be optimized for the plants' early growth cycle. Nurseries may be vertically set up such that plants are arranged in an indoor vertical farm. Next, the plants may be transplanted to a greenhouse for the final phase of their growth. In an exemplary embodiment, the greenhouse may not be vertically arranged, and the plants may instead be arranged horizontally or flat and may receive natural and/or artificial sunlight. They may be harvested from the greenhouse at an optimal time.

An exemplary embodiment may implement a control system to collect and process data and automate the system, for example by periodically or continuously retrieving sensor data on the control unit. The automated system may be configured to optimize the root length in the nursery phases by monitoring the lifecycle of a plant, such as by measuring the root length, root surface area, size, weight, leaf size, and the like throughout. For example, the system may identify an optimal root length in a nursery phase at which point the plants should be moved to the greenhouse phase. The optimal root length may be chosen based on measured data, as well as historical plant data. For example, the control system may identify and store the target root length at which a plant has been moved to the greenhouse, and then may use that stored information in subsequent plant lifecycles to optimize plant growth. The system may aggregate collected and measured data to make intuitive decisions to optimize the duration of the plants' lifecycle in each functional phase from germination, to seedling, to production. Plants with longer roots may grow faster and absorb more nutrients in the greenhouse phase. It may be contemplated that the system identifies the root length at which the time spent in the greenhouse is reduced to a minimum, and compared to the extra time required to grow the roots an additional length. An exemplary embodiment may further couple optimized plant growth in the varying functional phases with the real-time operational costs to guide decisions to maximize economic returns. For example, it may be contemplated for the control unit to periodically (for example, daily) compare expected economic return data (which may, for example, be retrieved from an external commerce site with current prices or which may be retrieved from a local database that is updated periodically) to expected real-time operational cost data in order to identify a point at which the marginal operational cost of promoting further growth exceeds the expected return from doing so. The optimal length may be chosen based on a length at which point where further growth of the roots will not benefit or reduce the greenhouse phase duration further. In other words, a point of diminishing returns may be identified based on the root length and the time spent in the greenhouse phase.

An exemplary embodiment may measure dependent variables as well as independent variables, or environmental data, such as light, temperature, humidity, and the like. The independent variables may be altered by the control system. The system may identify optimal independent variables for each plant. Historical plant data may be stored and compared in order to find the optimal independent variables. Other than root or plant growth, the independent variables may also be weighed against available space and cost.

In an exemplary embodiment, the control system may be, for example, a programmable logic controller (PLC) system. The control system may incorporate artificial intelligence (AI) algorithms to optimize and control the environmental parameters or independent variables. Thermal, electronic, moisture, nutrient, and temperature sensors, may feed data to the control system. The thermal, electronic, moisture, nutrient, and temperature sensors may include various sensors that would be understood by a person having ordinary skill in the art. For example, water temperature, leaf surface temperature, gas exchange and fluorescence, Normalized Difference Vegetation Index (NDVI) data, reflectance, soil moisture, electrical conductivity, pH, ORP, and dissolved oxygen may be measured from the plants and the environment. Air temperature, relative humidity, $CO_2$ content, light intensity (or photosynthetically active radiation, PAR), light quality (spectrum), and air velocity may be measured from the environment. Any other measurement may be contemplated as well. The control system may then process the input data, such as via an AI, to then identify which environmental parameters should be altered or modified to optimize the plant growth. An exemplary control system AI may implement machine learning, for example, based on an algorithmic driven regression formula.

Different plants may be grown in different nurseries or greenhouses, and the system may optimize each plant's environmental parameters individually, since some plants may require or flourish under different conditions than others. Any contemplated method, such as Normalized Difference Water Index (NDWI), NDVI, image recognition, thermal imaging, and LIDAR (light detection and ranging) may be implemented in order to determine factors such as moisture content or size of the plant. Various dependent variables may be measured from the plant. For example, LIDAR data may identify that a plant has reached its target size and is ready for harvest. LIDAR may be used in an exemplary embodiment; however, alternative ranging, image recognition, and thermal imaging technologies may be used, as would be understood by a person having ordinary skill in the art. It may be contemplated that plant health may be measured or quantified by measuring some dependent variables such as, for example, an amount of mold, mildew, or pests present. The dependent variables may further include leaf growth, weight, and the like. An exemplary embodiment may implement any type of sensor, such as a biosensor, biochemical, image, and/or metal-oxide semiconductor (MOS) sensor. Alternatively, it may be contemplated that data is retrieved from a separate system or is manually entered into the system.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
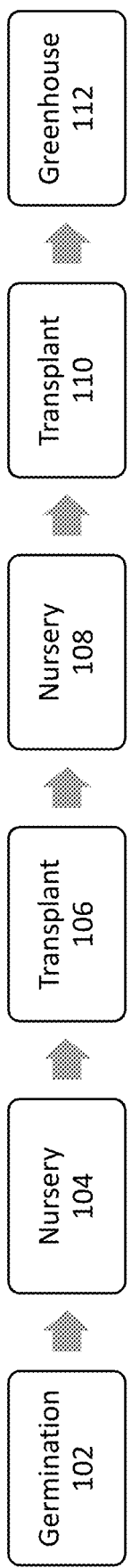
FIG. 1 is an exemplary schematic flowchart of an exemplary farming process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g. application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

A method for efficiently growing crops by optimizing root length and manipulating plant density to optimize yield may be shown and described. In an exemplary embodiment, plants may be indexed to enable optimal growth. (For reference, insofar as the term "indexed" or "indexing" is used in this document, it may be understood to have its meaning in the field of inventory management and control, relating to persistent tracking of individual items, rather than its botanical meaning relating to a system of identifying plant diseases.) While in various exemplary embodiments a time in which indexing is performed may vary, it may be contemplated to monitor each plant throughout its entire lifecycle, from when it is planted as a seed to when it is harvested. The indexing of plants may identify, based on the plant lifecycle, an optimal time to transplant the plants from one phase to another. This allows for a more efficient use of square footage, labor, plant health inputs, energy usage, and equipment, for example by reducing the amount of information-gathering that may have to be collected by workers reviewing and grading the plants at specific stages of the process such as transplant or harvest stages. Technology and automation may be implemented to further improve efficiency. A combination of natural and artificial light can be used in the facilities to optimally grow the plants. The improved efficiency and optimization may be used to determine target weight, height and root length, to reach the target in the fewest days possible, and to maximize a success rate of survivability and achieving the target. The optimization may occur in each phase, including the nursery phases and greenhouse phase. An artificial intelligence or AI program may be implemented to control and identify how to optimize crop growth.

FIG. 1 may illustrate an exemplary plant growing process. In an exemplary embodiment, the plant growing process may be split into multiple phases. Each phase may occur in a different location to optimize the environment or space use efficiency to maximize productivity. For example, a first phase may be the germination phase 102. The next phase 104 may be a nursery phase. The nursery phase may include a vertical growing environment may be referred to as a vertical or stack phase. Then, the plants may be indexed and moved 106 to subsequent one or more nurseries 108. The transplant 106 may be implemented using robotics. In an alternative exemplary embodiment, the plants may be kept in a first nursery, which may then be transformed in order to change the nursery conditions, thus minimizing movement of plants. For example, in an exemplary embodiment, the trays in the first or subsequent nurseries or stages of the stack phase may be altered to have an open bottom portion or enclosed cell with space between base of plug and bottom of tray to encourage root growth such that the substrate containing the root plug is suspended above the bottom of the tray in comparison to conventional trays where the substrate fills the entire volume and depth of the unit. The internal chamber below the suspended substrate plugs serves to provide a microclimate so as air pruning does not occur, for example by allowing humidity to be maintained at a desirable level within the internal chamber and enables efficient water use.

Additionally, the shape of the internal chamber trains the developing roots of the plants so as which they can be successfully transplanted into subsequent trays or floating rafts. Further, modification of the delivery methodology of the nutrient solution in a cyclical manner to optimize water and nutrient uptake while allowing for an oxygen rich environment may be implemented with consideration to the altered design of a suspended root zone. The water level, depth of the plant plug, depth of water table, a custom drain/flush/fill cycle, or the plant tray design may be altered during the nursery phase in order to create a space between the plant site and the water. In an exemplary embodiment, the flood cycle and water line may be manipulated based on root length which may be estimated using computer vision. The root zone or root zone substrate may be encapsulated in an internal chamber to form or control a microclimate surrounding the root zone substrate. By controlling the microclimate, such as by altering or setting a humidity level, temperature, carbon dioxide or oxygen level, a vapor-pressure deficit, or any other contemplated parameter, air pruning of the plants can be prevented, and the root growth can be further optimized. The controlled microclimate may be an area below the substrate but above the water. Controlling the microclimate around the roots and below the substrate separately from the climate above the plants, such as around the leaves, can optimize root growth.

Coupling the tray design of a suspended plug with the cultural practices of the nutrient solution promotes root extension and elongation beyond the substrate rhizosphere without the detriment of air pruning. The surface area of the roots grown in the suspended plug with modified irrigation cycles may be increased, as compared to roots grown traditionally or without a space. Drawing and maintaining an active rhizosphere outside of the substrate plug may enhance the transplantability of the plant and could further reduce days of production. The orientation and environment of the first nursery could be altered, including spacing between plants, which may reduce or eliminate the need for transplanting to additional nurseries.

The various phases of the cycle may be customized for different cultivars or varietals and may be adjusted over time. The phases may be customized for optimal time. Each phase may implement, for example, a hydroponic system, which may be a natural or artificial system and may include a greenhouse, a vertical configuration, a deep-water agriculture location, nutrient film technique (NFT), a body of water or any combination thereof. The number of phases, including nursery phases and the specific indexing may all be adjusted as necessary to optimize the process. Different varietals may use any number of nurseries and associated nursery phases. Plants may be supported throughout the phases on platforms that may have at least one plant site. The platforms may be tables, trays, rafts or hydroponic plant vessels, which may be removable but secure to a hydroponic system structure, rest on a hydroponic system structure, float on a hydroponic system, or otherwise support a plant to facilitate hydroponic growing as would be understood by a person having ordinary skill in the science.

A first exemplary phase may be the germination phase 102. In this phase, the crop is initially planted and sprouts from the seed. Germination may take place in a dedicated location or machine. For example, a specific germination chamber may be used in order to house some number of plants or a dedicated germination room used in order to house some number of plants may be implemented; in various exemplary embodiments, such chamber and/or room may be configured to modulate its internal environment based on one or more environmental factors including, for example, the air temperature, relative humidity, light, light intensity, $CO_2$ content, air velocity, and/or air circulation needs of the plants during a given phase. By individually modulating environmental factors in each germination location or machine, the speed and rate of germination may be increased. Multiple cycles of germination may populate the nursery phase or phases.

Another exemplary phase may be a nursery phase 104. In this phase 104, the plants may begin the seedling development stage. Formulas may be implemented in order to optimize environmental factors to more efficiently grow the plants. For example, a formula may optimize root length, plant density per square foot, nutrient type and volume, and increase light use efficiency from seed to harvest. Each plant product may be associated with a stock keeping unit (SKU) which may indicate a dynamic recipe identifying input and product specifications for each phase. The dynamic recipe may be altered or updated by an exemplary embodiment. The minimum footprint and energy usage may be obtained while maximizing yield. The plants may be indexed so as to ensure maximum light absorption while minimizing light wasted on non-foliage space, or white space. In the nursery phase plants may be disposed on a nursery tray with optimal plant spacing and density. The water level, depth and position of the plant plug, depth of water table, a custom drain/flush/fill cycle, or the plant tray design may be altered such that the roots are suspended above the water.

In an exemplary nursery phase 104, the plants may begin their lifecycle. They may continue in the nursery until they reach a desired root or plant size. It may be contemplated that the desired root size may be chosen based on the maximum potential optimization of the subsequent phase or phases. For example, an exemplary embodiment may identify a root length at which the plant will reach maturity in the greenhouse phase at an optimal time. By optimizing root length in the nursery phase, the plants may grow quicker in the greenhouse phase. Additional time spent growing the roots in the nursery phase may be compared to the additional time saved in the greenhouse phase to identify a point of diminishing returns, which may be the optimal time to end the nursery phase and move the plants into the greenhouse. An exemplary embodiment may also choose the size to move the plants based on space available, such that plants grow in a nursery until further growth is inhibited by plant density.

At a desired point in the lifecycle, the plants may be transferred to one or more subsequent nurseries for subsequent nursery phases 108 or may be transferred to a greenhouse. In an exemplary subsequent nursery phase, the plants may be larger. Environmental conditions may be changed as plants grow or when plants are moved to subsequent phases or nurseries. For example, an increased daily light integral (DLI) or photoperiod may be implemented, where a higher intensity light is used and/or the active lighting period is extended. Air flow may be increased to enhance transportation. Increased levels of nutrients may also be implemented to support the increased growth and development of the plant. In an exemplary embodiment, plants may be spread further apart in order to enhance or accommodate an increased size. It may be contemplated that the plants may be transplanted to a different tray in a subsequent nursery phase. For example, the tray in the nursery phase may incorporate an open bottom and may be raised higher than the water. The water level, depth of the plant plug, depth of water table, a custom drain/flush/fill cycle, or the plant tray design may be altered to space the roots away from the water. As previously discussed, by suspending the substrate and plants to create a space between the plant plug at the bottom of the tray and the surface of the water, the roots may be encouraged to grow and extend downwards towards the water and nutrients. Additionally, the subsequent nursery phases may incorporate alternative watering methods than those used in previous nurseries. For example, the plants in a second nursery may use a nutrient film technique or modified ebb and flow, regardless of the fertigation or hydroponic methodology of the first nursery stage.

During the nursery phase 104 (and potentially subsequent nursery phases 108), plant size and parameters may be measured. For example, plant size and root length may be measured using appropriate sensors, cameras, and software to process the sensor data. The measurement may occur while the plants are still in the trays. The size of the roots may be measured using appropriate sensors, imaging and software tools, and mechanical means. An exemplary embodiment may identify an optimal root size and plant density at which to transplant 106 the plants from a nursery phase to a subsequent nursery phase, or to a greenhouse phase.

In an exemplary embodiment, the environment and form factor of the supportive tray, flat, or container in a nursery phase and/or greenhouse phase may be altered or manipulated in order to expedite root development. For example, the bottom of the trays may be opened after one or more nursery phases, and before another nursery phase. The watering system may be altered between phases too. In an exemplary embodiment, the height of the plant plug above the water may be altered to create a space between the water and the plant plug. The alteration may be accomplished by reducing the water level so that the surface of the water is farther from the plant plug, or by altering or moving the plants to a different tray which raises the plug away from the water as compared to the previous or original tray. An enclosed cavity below may guide root growth outside of the substrate. A modified irrigation schedule may be used to control the water level, creating the space between the water and the plant plug. When using traditional trays, the roots of the plant may get caught around and between the tray, even if perforated, and thus do not extend downwards as they would with the open tray design. Further, it may be contemplated that one nursery phase implements, for example, an ebb and flow system, while a subsequent nursery implements NFT or a modified ebb and flow methodology.

As plants grow or during a transplant 106 to a subsequent phase or nursery, the number of plants transferred may optionally be reduced. In some embodiments, the reduction may be plant specific for optimization. As a result, the plants may be less densely configured so as to allow them room to grow. The step of reducing plant numbers may allow plants to be grown densely early in the lifecycle and spread out later in subsequent phases or nurseries, thus allowing for a larger number of plants to be grown. Alternatively, the plants may be transplanted to a less dense configuration without reducing the number of plants.

According to an exemplary embodiment, all plants being indexed may be moved from a germination phase to a nursery, a nursery to subsequent nurseries or stack phases, a nursery to a greenhouse, or a subsequent nursery to a greenhouse and the transplanting machine may take a seedling tray with an initial density, and automatically transfer some or all of the plants to one or more new trays with adjusted spacing for optimized root length density at the next phase. According to some exemplary embodiments, time in various phases may be an input in an optimization formula. For example, the time and indexing in the nursery phases may optionally be adjusted to achieve a desired time or root length in a greenhouse phase. An exemplary greenhouse phase may have a desired length in days, which may be used to optimize the nursery phases. In the nursery phases, root length, indexing, time, and environmental conditions may be optimized to minimize the length of time in the greenhouse. As would be understood by a person having ordinary skill in the art, this may be an exemplary embodiment and may be unique for each varietal.

An embodiment may measure plant root length, mass, and growth surface area. For example, the surface area of roots which contacts the planting substrate (e.g., the growing solution, nutrient rich water, or any other potential substrate upon which the plants are rooted) may be expedited and optimized. An optimization formula may identify optimal times for moving the plants to a next phase such as from a first nursery 104 to a second nursery 108, or to a greenhouse 112. Additionally, the watering method may be altered in one or more nursery or greenhouse phases to further expedite root growth. For example, a first nursery may implement a deep water culture while a subsequent nursery implements a shallow water or NFT. In another example, both a first nursery may implement an ebb and flow system and the subsequent nursery may also implement an ebb and flow system as well, but with a different watering schedule or shorter intervals. Root development may be further optimized by modifying the nutrients, lighting, temperature, humidity and other conditions. In an exemplary embodiment, a control system may record and store the conditions alongside the root length or rate of root length growth, and the stored conditions, variables, and measurements may create a historical record. The historical record may be analyzed to identify optimal independent variables for optimizing root length in the nursery and for reducing overall time from seed to harvest.

Each plant/varietal may be individually indexed and may have its own indexing formula in each nursery. A historical record of plants may include information relating to various optimal parameters, such as plant density in trays, individual plant size/mass, plant root size/mass, nutrient or water intake, lighting and environmental parameters, a time spent in any of the phases, and the like. For example, plant A may germinate and grow quickly as compared to other plants. Plant A may allow for a higher density but fewer days in a nursery. The density may be decreased in a subsequent nursery and may be further decreased in the greenhouse. The days in the subsequent nursery and/or the greenhouse may also be lower. On the other hand, plant B may require lower density in each phase and more days in the nurseries and greenhouse. Each plant varietal may have an individualized formula based on root length, nutrients, and any other contemplated variables, to optimize efficiency.

In certain embodiments, some or all of the plants from a nursery may be transplanted 106 to one or more subsequent nurseries. In alternative embodiments, the size of the nurseries may vary to accommodate the change in density and duration. According to an exemplary embodiment, the plants may be disposed on a nursery specific tray, which may optimize the conditions in which the seedling develops tap roots, such that the roots reach down and do not become bound in the nursery specific tray. The tray may be specific to a particular plant species. Nurseries may refer to different physical locations of the plant cycle; however, it may be understood that a nursery may include one or more physical nursery spaces. Nurseries may be different physical sizes or a different number of physical nurseries to accommodate optimal plant density and duration. The duration may be the residence time, or amount of time a plant may spend in each of the nurseries (or in a greenhouse). Furthermore, the trays of a subsequent nursery may be different from an initial nursery to achieve the desired optimization.

Referring back to FIG. 1, the plants may be transplanted 106 from a nursery to one or more subsequent nurseries for a second or subsequent nursery phase 108. As previously discussed, after requisite time in the nursery, the plants may be transferred to the one or more subsequent nurseries. It may be contemplated that different varietals of plants in a nursery may remain in the nursery for different periods of time. Different watering methods and different trays may also be implemented in the subsequent nurseries. The seeds may be initially planted into a tray, which may be above water, glue plugs, soil, or a substrate. After a nursery phase, plants may be mechanically transplanted from their cell trays into lower density trays, depending on the type or varietal. The transplanter may grip the plant plug using robotic members in order to move. In an alternative embodiment, the plants may be each individually placed in pods which may be gripped and moved by the transplanter.

In an exemplary embodiment, computer vision and robotics may be implemented by the control unit to identify plants ready for transplant (based on the previously described factors), identify the location and size of the plant and instruct the robotic arm member to surround the targeted plant, engage/grip the plant from the root, and then lift the plant out of the tray or substrate and into the subsequent substrate (which may be a tray or raft for a subsequent nursery phase or greenhouse phase, or may be a final substrate for harvested plants). It may be contemplated that the transplanting process between phases and for harvesting may be entirely automated, such that a control unit identifies a time at which transplanting to a next phase is optimal, and then commands the appropriate robotic members to execute the transplant. The control unit may implement machine learning and artificial intelligence, and may be a cloud based system.

Upon completion of subsequent nursery phases, plants may be mechanically transplanted from the tray configuration to a hydroponic plant vessel, in an exemplary embodiment. The hydroponic plant vessel may be a part of a greenhouse hydroponic system. Hydroponic plant vessels may have a desired number of cells for optimal plant density and may be specific to varietals.

The plants may then continue growing in the one or more subsequent nurseries, which may optionally be less dense and may allow the plants additional space for further growth. The subsequent nursery phase may have specific trays and watering system that promotes root growth, thus expediting the process in which the roots develop as compared to traditional vertical farming or greenhouse systems.

In an exemplary embodiment, another transplant 110 may occur to move the plants from a nursery or subsequent nursery to the greenhouse phase 112. The transplant 110 may also be implemented via robotics. In an exemplary greenhouse phase, plants may no longer be vertically arranged and instead may be laid out or arranged in order to capture natural sunlight. The natural sunlight may increase the speed at which the plants reach their final form, and supplemental lighting might not be needed or may be reduced. Upon switching to an exemplary greenhouse phase, the plants may be placed onto less dense rafts to finish the final growth phase. The plants may have developed tap roots in the nursery (or nurseries) phase such that the roots are in the nutrient rich water solution (or substrate etc.) immediately after transplant. This is much improved than the alternative methods of greenhouse farming which the roots do not reach down into the solution until much further along in the process. This novel solution creates an environment for the plant to thrive much quicker and ultimately lessens the time needed for the plant to reach full maturity. The raft may be designed such that the roots drop down directly through the raft into the nutrient-rich water in the greenhouse phase. The freeboard of the raft may be smaller. A deep-water culture hydroponic system may be implemented in the greenhouse phase. Alternatively, the greenhouse phase may implement an NFT channel system, which may not require the use of rafts.

It may be contemplated that more than one watering method may be implemented. For example, an exemplary nursery may implement an ebb flow, flood drain hydroponic system, NFT, or shallow water culture system while an exemplary greenhouse may implement a deep-water culture hydroponic system. The water level in the nurseries or greenhouse may also be altered to optimize tap root length and growth. For example, the water level in the nursery may be lowered, creating a gap between the plant plug and the surface of the water. As the water surface is lowered away from the plant plug, the roots may be encouraged to develop further downwards, thus expediting their growth. Plants with longer and larger tap roots may have a larger root surface area contacting the water, may absorb more nutrients (for example, in the greenhouse phase), and therefore may grow faster.

It may be contemplated that the watering system is altered during one or more of the phases. For example, in a nursery phase, the watering system may switch from an ebb-flow system to NFT, shallow water culture or deep water culture system. Such that the nursery creates an environment that encourages root development of young plants.

One or more sensors may be implemented to determine factors indicating an optimal time to switch to a different watering system. For example, it may be contemplated that once the roots reach a predetermined size or surface area, a nursery phase may switch from an ebb-flow system to a deep-water culture system. The flow rate of water and/or nutrients may similarly be adjusted. Further, the watering schedule and water level may be optimized based on the measured root length as well as the time spent in each phase.

An exemplary embodiment may configure a plant arrangement on a tray. Each tray may configure a number of plants, the density of which may be determined by the size of the plants in the corresponding phase. The trays may be configured to optimize the water techniques. In an exemplary embodiment, a tray may encourage root growth. The tray may suspend roots in the planting substrate or nutrient rich water solution so that a maximum surface area of the roots contacts the substrate.

It may be contemplated that each of the nursery phases or greenhouse phases may be configured to adjust or switch between one or more watering systems. For example, a vertical nursery may be configured to switch watering systems, or a greenhouse may alternatively or additionally be configured to do the same.

Further, an exemplary embodiment may alter the water designs. For example, the water design may be altered depending on the plant variety and stage in the plant lifecycle. An exemplary embodiment may be configured to alter the depth of the water. An exemplary AI control unit may identify an optimal space between roots of a plant and the nutrient solution, and then may activate appropriate systems (such as pumps or drain valves) to alter the depth of the water. For example, the plants and plant plug may be directly in contact with the nutrient solution beginning a nursery phase. As the roots begin to develop, the plant may absorb the water and nutrients, and the roots may grow longer. As the roots grow longer, the surface of the water may be reduced, or the plant plug may be raised, in order to create a distance between the plug and the water surface. Although the plug is raised, the roots may still contact the water at all times.

In an exemplary embodiment, passive cooling (potentially evaporative in nature) may be implemented in the greenhouse, as opposed to the mechanical cooling & heating systems used in nurseries. It may be contemplated that mechanical cooling & heating or other systems are used throughout, depending on the climate and the application. Other systems may be contemplated. For example, a passive cooling system may be used. Nutritional and environmental conditions may also be altered in the greenhouse or nursery. Nutrients may be added throughout the phases. In an exemplary embodiment, the supply of nutrients may be controlled by an automated control system. An exemplary automated nutrient control system may modify the supply of nutrients based on, for example, the plant parameters, environmental parameters, plant size, root size, root surface area, or based on the type of watering system implemented.

Figure 2:
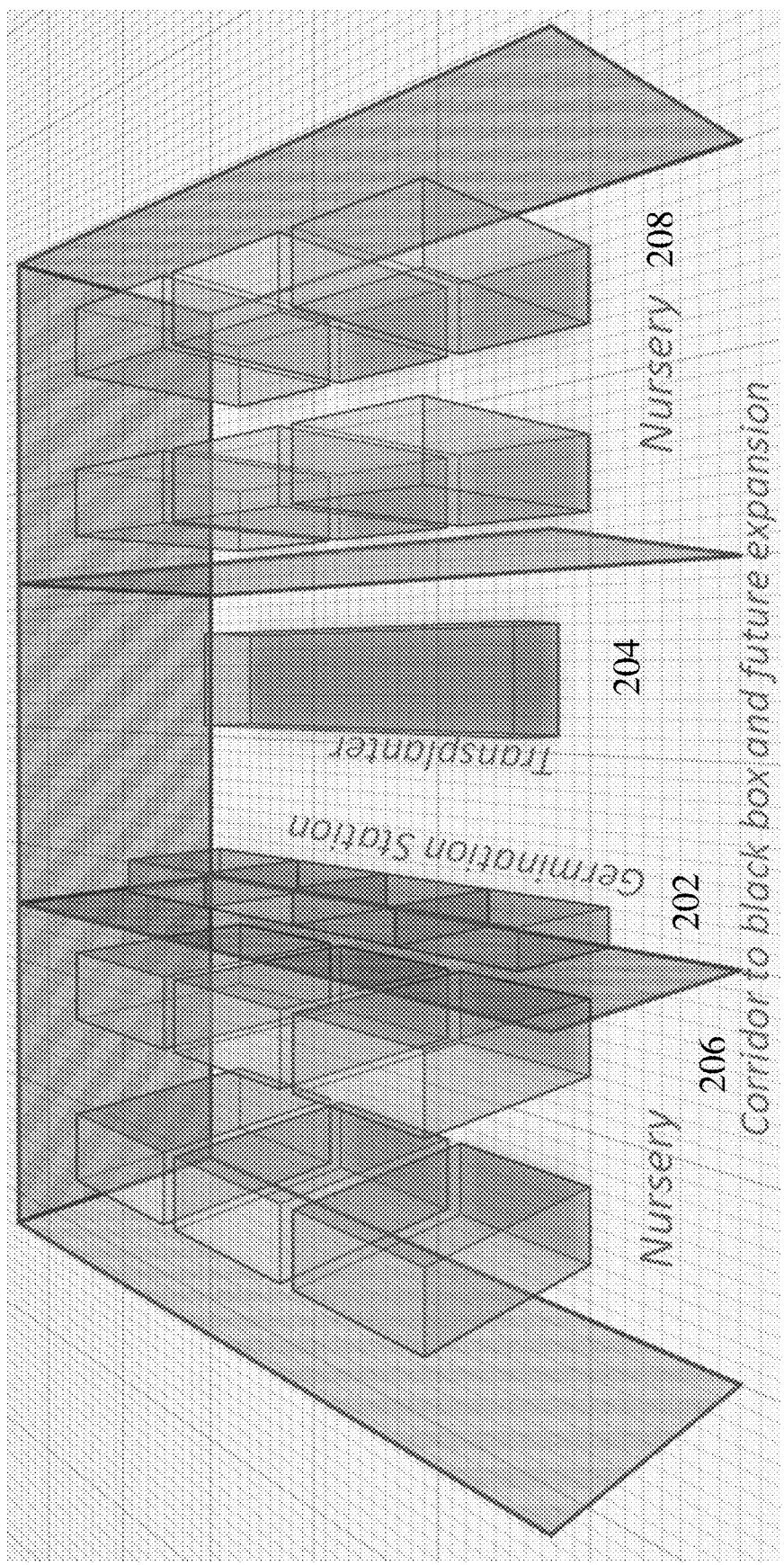
FIG. 2 is an exemplary embodiment of a Nursery.

Referring now to the exemplary embodiment in FIG. 2, FIG. 2 may show an exemplary nursery facility. Nurseries 206, 208 may be separated by a germination station 202 and a transplanter 204. An exemplary germination station 202 may be a vertically setup station. The germinated plants may then be moved into a nursery 206.

In an exemplary embodiment, the transplanter 204 may be utilized to index the plants from a nursery 206 to one or more subsequent phases or nurseries 208. After the appropriate period of time, the same transplanter 204 may be programmed to transplant the plants into the greenhouse hydroponic plant vessels.

The germination phase may implement specialized equipment or spaces to increase environmental parameters such as temperature and humidity of the ambient space, such that the controlled environment created accelerates the germination of the sowed seeds. In an exemplary embodiment, the transplanter may be an automated and mechanized piece of equipment designed to index seedlings with different densities. The transplanter may be capable of indexing seedlings from tray to tray with differing densities and also from tray to hydroponic plant vessel with differing densities. The density may vary by varietal; different varietals or cultivars may require a different density.

Figure 3:
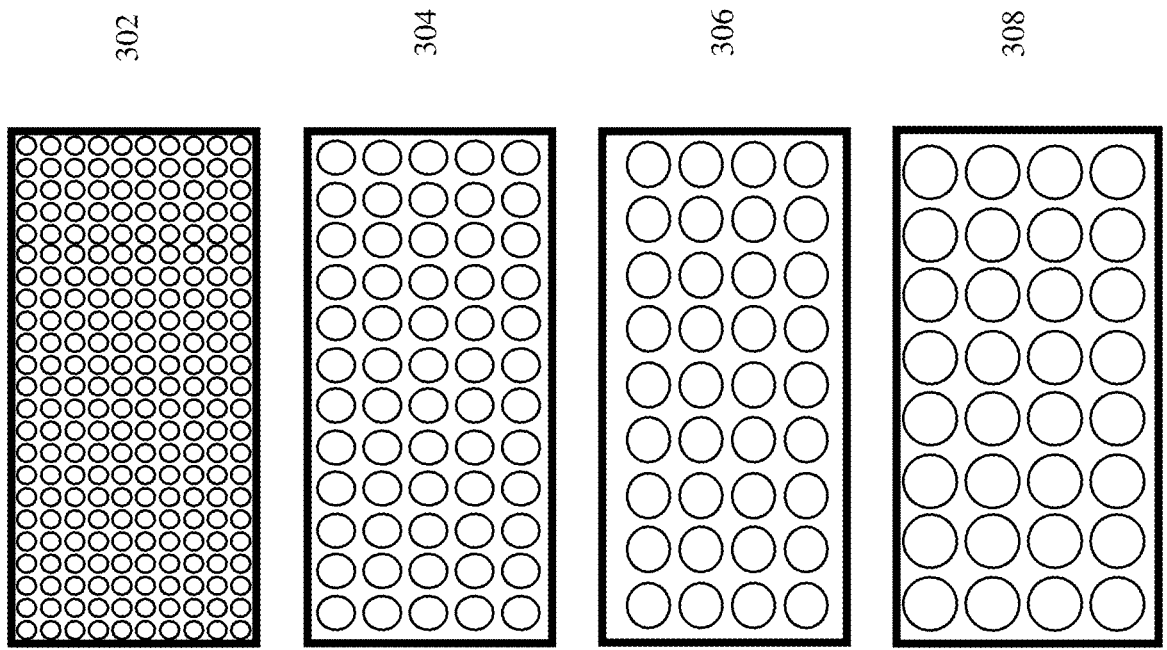
FIG. 3 is an exemplary flowchart depicting plant indexing of a farming process.

Referring now to FIG. 3, FIG. 3 may show an exemplary embodiment of plants at different lifecycles in varied trays. As shown in FIG. 3, a tray 302 may be densely packed at the earliest stage of the planting. Next, a subsequent tray 304 may be shown where the plants are larger and more spread out to account for their increased sized. For example, a densely populated tray may be used at an early germination phase, and then plants may be indexed to a less densely packed tray as they grow. For example, a third tray 306 may be implemented for an additional nursery phase, further spacing away the plants, and a fourth tray 308 may further decrease the plant density in a subsequent phase and may increase the spacing. It may be contemplated that an exemplary embodiment used for cultivating larger plants may use more phases. In this example, the density may be adjusted at various points in the plant lifecycle. If a single tray were used for the entire plant lifecycle, that single tray would have to accommodate the large plant based on its projected final size, and thus the space in between plants may be wasted during the initial phases of the lifecycle. An exemplary embodiment solves the issue of wasted space, energy, and operational expenses by optimizing the density between plants using the multiple nursery phases and appropriately sized trays.

An exemplary multi-nursery design that encourages tap root growth may optimize plant growth and increase yield. According to some exemplary embodiments, plants per square foot, energy savings per plant site, annual facility yield or yield per square foot may be increased. The next stage may be the greenhouse phase, where the plants may be kept in a greenhouse and may be horizontally or traditionally oriented. In an exemplary embodiment, plants may be placed on a hydroponic plant vessel, or a raft. The hydroponic plant vessels may be movable throughout an exemplary greenhouse system. In some embodiments, the hydroponic plant vessels may float above a substrate, for example, if the substrate is a nutrient rich water solution.

An exemplary greenhouse system phase (which may be hydroponic), may be the final phase where the plants are placed in order to quickly reach their final size of the farming cycle. The use of a final greenhouse system and natural sunlight may allow the plants to grow at a larger rate. Further, the optimization of the roots in the nursery phase or phases may also increase the growth rate in the greenhouse. Plant growth may be exponentially faster when transplanted to a final greenhouse phase where the roots of each seedling are developed and in contact with the substrate/nutrient rich water solution. An AI system may calculate the ideal time to move plants into the greenhouse phase, and when to harvest from the greenhouse phase. The ideal time to move plants from the nursery phase to the greenhouse phase may be calculated based on the root length to optimize or decrease the total amount of time required for the plants grow to maturity and the available natural and artificial light avail in the stage. It may be contemplated that environmental and other factors are also optimized by the AI in the greenhouse phase.

The time at which the plants are placed in a nursery or subsequent nursery is optimized in order to shorten the total length of time needed to grow the plants. The final greenhouse system may facilitate growth during the final stage of the plant's hydroponic farming cycle. The final hydroponic system may be implemented in a greenhouse. Plants may only spend a short time on the final hydroponic system, thus allowing for quick product flexibility and hedging against disease risk/exposure. Purely vertical farms might not benefit from the same exponential growth caused by implementing greenhouses (which may use hydroponic systems). The use of natural sunlight and extensive root development may expedite the growth of the plants in the final stage, and thus the AI control unit can optimize the growth of plants by placing a large number of plants in a stacked/vertical nursery phase, and then moving a smaller number of plants to quickly finish growth in a horizontal greenhouse phase in which the plants may receive natural sunlight.

The greenhouse may be a hydroponic system, and may have associated hydroponic plant vessels. An exemplary hydroponic plant vessel may include multiple plant sites. Each exemplary hydroponic plant vessel may include a single varietal of crop. Each hydroponic plant vessel may be individually controlled, monitored, and harvested. A single hydroponic plant vessel may allow for large product flexibility and no operational inefficiencies between crop types. A hydroponic plant vessel may have any number of plant sites. In an exemplary embodiment, each hydroponic plant vessel may only include a single type of plant. An AI may be implemented to track a large number of hydroponic plant vessels. The AI system may customize plant parameters within each vessel according to the plant type.

The optimization techniques provided, if desired, may be governed according to one or more predetermined rules in order to optimize the photon-per-square-foot efficiency for a particular plant or series of plants. Such rules may vary based on the plants or combinations of plants at each stage; different types of plants may benefit from different amounts of light generally, or may benefit from different amounts of light at different stages in their growth cycle; additionally, certain types of light may be more effective at different stages of the growth cycle for certain plants, which may also adjust how these rules may be applied. Likewise, such rules may additionally vary based on light conditions, which may vary based on season, altitude, transmissivity of the greenhouse glass, availability of artificial light, and so forth. In order to determine an appropriate set of rules governing a particular set of plants, plant specifications and particular set of conditions, it may be contemplated to measure whitespace and greenspace daily for a set of plants from seed to harvest, with the density of the planting and the time that the plants spend in each phase then being optimized as a result of the measured whitespace and greenspace. The plant density and duration in each phase may be optimized to account for and optimize the plant roots, such that the plant roots have an optimal surface area contacting the substrate.

It may be contemplated that the optimization techniques may be implemented by an autonomous control unit or AI system. The AI may implement the predetermined rules to optimize efficiency. Sensors can feed the AI data regarding the conditions, plant/root size or parameters, whitespace, and greenspace for the set of plants. The AI may process that data along with the rules and/or historical plant data to optimize the plant conditions and plant density.

In an exemplary embodiment, for the sake of illustrating an exemplary cycle, each nursery may have a given size and the greenhouse may have a certain size. It may be contemplated that a variety of nursery and greenhouse sizes may be compatible with this exemplary technique, and that the values shown herein are merely illustrative values arbitrarily chosen for descriptive purposes. According to one illustrative exemplary embodiment, an exemplary nursery may have a size of 100 to 100,000 square feet and a greenhouse may have a size of 100 to 500,000 square feet. In this example, there may be a total of 10,000 plants in a nursery, meaning that the total plants per square foot may be determined based on the total number of plants divided by the total amount of nursery square footage, yielding a density of plants per square foot in the nursery. According to some exemplary embodiments, an exemplary nursery may have 100 to 1,000,000 plants. These figures are used merely for illustrative purposes in order to illustrate that the nurseries may have a higher plant density than the greenhouses, and it may be contemplated that more plants may be planted in any phase, and each nursery or greenhouse can be as large as needed. A yield of plant sites per square foot per day may be calculated by dividing the number of plants per square foot by the number of days in a nursery. A subsequent nursery may have less plants in a similar amount of square footage, which may result in lower plant density and fewer plants per square foot. However, the plants may spend less time in the subsequent nursery resulting in a similar yield of plant sites per square foot per day. An AI system may operate as a control unit that may autonomously identify an ideal density for each of the nursery phases and greenhouse phase which optimizes plant growth. The identified ideal density may be based on historical plant data as well as other factors or equations used to optimize the speed and volume of plant growth. The AI system may also instruct another system or a robotic system to move or transplant the plants from the nursery phase to subsequent nursery or greenhouse phases.

The greenhouse density may then be calculated based on the total number of plants in the greenhouse, divided by the total greenhouse space, yielding a total of plants per square foot in the greenhouse. According to some exemplary embodiments, the number of plants in the greenhouse may be between 0 and the number of plant sites in the nursery phases. According to some exemplary embodiments, a greenhouse may have 100 to 1,000,000 or more plants. Greenhouse efficiency may be represented by plant sites per square foot per day. The daily yield of plants per day may be determined by the square footage of the greenhouse multiplied by the number of plant sites per square foot per day. This data may then be optimized to solve for the largest or optimal number of plants per day. An AI system or control unit may identify the relevant variables which affect the optimal number of plants possible, may adjust plant parameters or conditions to optimize the life or growth of the plants, and may arrange or configure the plant arrangement in order to ensure that the optimal number of plants are transplanted in a given phase at any given time. Plant growth could be stunted when plants are too densely arranged. Further, a thinly populated arrangement is inefficient since extra white space may be utilized to grow additional plants. The AI system may optimize the plant growth rate to maximize efficient use of the white space. The exact number of plants at each phase may be impacted by survival of the plants during the lifecycle, as would be understood by a person having ordinary skill in the art.

An exemplary control unit for optimization may take into account diminishing returns which may result from particular adjustments. A maximum threshold of efficiency may be reached when it is determined that an increase would require a reduction in plants per square foot or an increase in photons. Traditional systems may put young plants onto the final (single) hydroponic system and thus may have a large amount of white space, or unused areas, in the greenhouse. However, exemplary techniques such as those discussed herein may minimize white space at every phase of the plant life cycle and may normalize the amount of time on the final hydroponic system. Optimization at the final hydroponic system may allow for a higher annual production and greenhouse turn capability. The amount of time in each phase and on the final hydroponic system may, as noted, be optimized based on the individual species; overcrowded nurseries may provide less space for plants to grow, and therefore additional plants may not provide a full return, but the threshold of when a nursery or greenhouse is "overcrowded" may be determined specifically for a given species or set of species. Thus, when an unsatisfactory level of diminishing returns is experienced or reached, it may be contemplated that the plants may then be placed in the next nursery or phase.

From the germination phase through the nursery phases, the plants may be monitored in order to ensure an optimal environment for their growth. Further, the monitoring of the plants may allow them to be moved between phases at an optimal or more efficient time. For example, once the plants reach a target weight and/or size, it may be favorable for them to move to a next phase. It may be contemplated that an AI system or control unit could be implemented in order to monitor the plants and to regulate their environment. The AI may be cloud based or may incorporate cloud-based data. The AI may be a machine learning algorithm, or the like. The AI may control the supple of nutrients throughout the plant life cycle.

Image recognition and sensor programable logic controllers may be implemented to drive optimization of critical environmental data. Some examples of environmental data to be optimized may be air temperature, relative humidity, light, light intensity, CO2 content, air velocity, and air circulation. The controllers may also control and/or measure the water temperature, electrical conductivity, pH level, dissolved oxygen level, moisture content, nutrients, and water of the plants. The environmental data may represent and environment, and environmental factors may be altered and optimized (such as, for example, altering the temperature by controlling an HVAC system, altering the dissolved oxygen level pH level, or nutrient content by activating corresponding pumps, and the like). The environment may be optimized specific to each plant growing.

Figure 4:
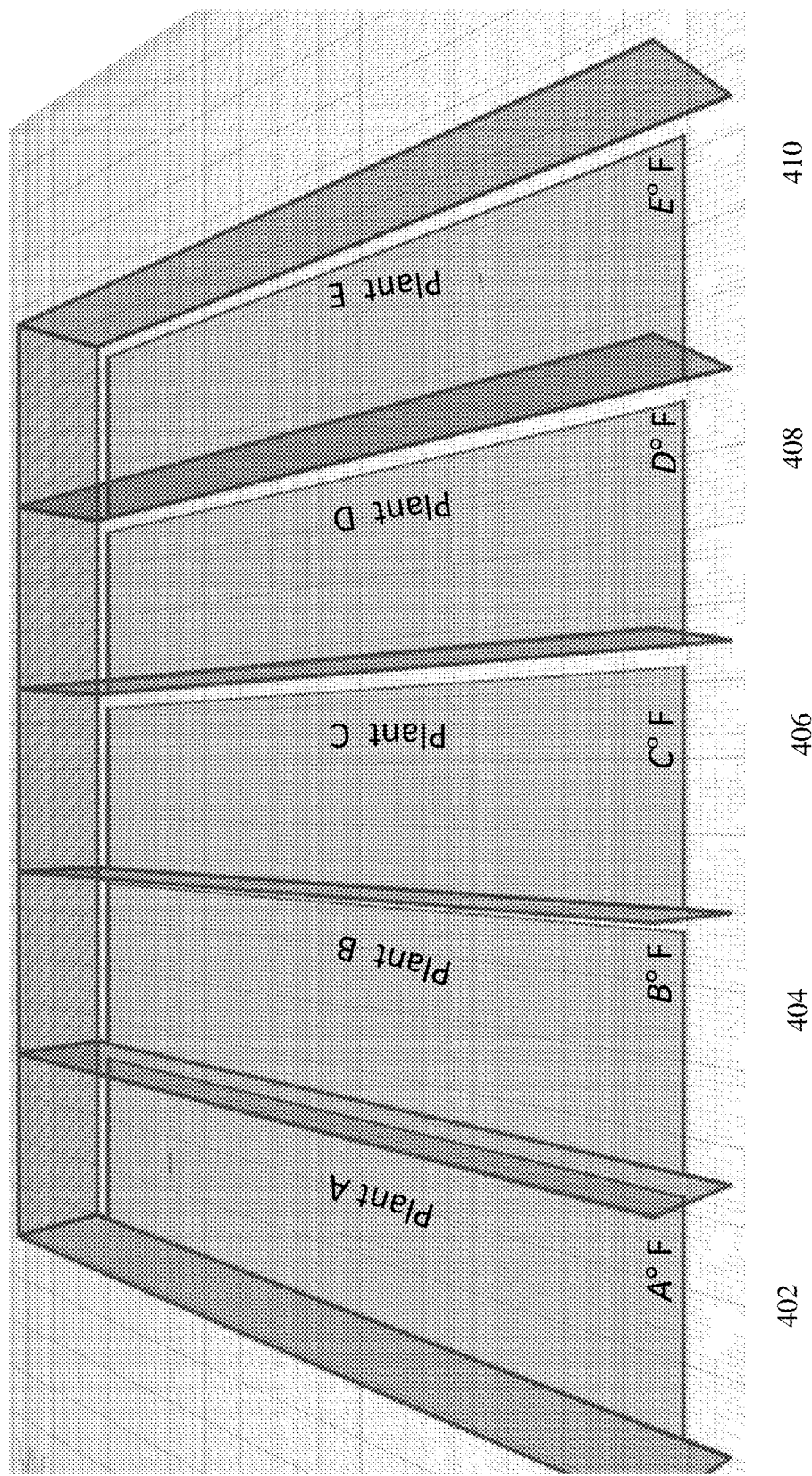
FIG. 4 is an exemplary embodiment of a farming facility split to farm different plants.

Referring now to FIG. 4, FIG. 4 may illustrate an exemplary division of plant products. The example in FIG. 4 shows 5 different plants in a facility which are separated from one another. In this exemplary embodiment used for illustrative purposes, Plant C 406 is kept at a different temperature from the neighboring Plant D 408. Similarly, the remaining plants 402, 404, and 410 are also kept at different temperatures. It may be contemplated that any environmental parameter, including but not limited to those described above, may be altered individually in each section. For example, it may be desirable for Plant C 406 to be grown at a higher humidity than Plant E 410. Each of the greenhouse zones may be monitored by their own individual sensors. Environmental parameters may be autonomously controlled by their own individual controllers which may drive various systems. In an exemplary embodiment, the AI may monitor the greenhouse zone and autonomously control the environmental parameters. In one embodiment, the controllers may be, for example, programmable logic controllers. Environmental parameters may differ between plants. For example, still referring to the exemplary embodiment in FIG. 4, Plant A 402 may be of a different species than Plant B 404, and therefore may require different environmental parameters, such as a different temperature and/or different nutrients. An exemplary AI system may identify the type of plant and then customize or adjust the parameters based on the plant type, as well as other information such as historical plant data.

For example, the AI may adjust a control unit set to control a heating or cooling unit, humidifier or dehumidifier, air purifier, water sprayer, nutrient sprayer, or any other contemplated mechanism which changes some environmental parameter. In an embodiment, the same control unit and AI may also implement image recognition, volumetric sensing, air and surface temperature detection, moisture content detection, or other sensors to determine when each plant is ready for transplant. Environmental sensors may measure temperature, humidity, CO2 concentration, light intensity or photosynthetic photon flux density (PPFD). Other exemplary sensors may be hydroponic sensors (which measure electrical conductivity), pH sensors, or dissolved oxygen sensors. The combination of these exemplary elements may allow for the AI to predict an optimal time for transplant.

In a further exemplary embodiment, AI may be implemented in the greenhouse phase. For example, LIDAR may be implemented to estimate the size and weight of the plants, and thermal imaging may provide data on the moisture content. These sensors or cameras may feed data to the control unit which could then optimize the environmental parameters.

Thermal imaging may provide moisture content readings to the control unit. This may be used, for example, to drive an overhead irrigation boom if moisture content readings are low. LIDAR may predict the growth rate, harvest time, and volume. Exemplary data may forecast accurate business or sales yield projections. LIDAR data on predictive growth rate and volume may also drive environmental parameters in the greenhouse.

Each plant, seed, tray or hydroponic plant vessel lot may have a graphical representation pulled from control system data which represents environmental data for each day of a seed's life from germination to harvest. Historical seed biometrics may be provided to the AI algorithm in order to better predict and optimize the process.

In an exemplary embodiment, robotics may be implemented. The transplants or the transplanter described above may include a robotic unit which extracts the plants and then places or plants them in another location or unit. Further, the plants may be planted on a shelf or other unit which is capable of movement and can be controlled by a control unit. The AI may control robotics to transplant or move the plants within each phase or between other phases. For example, an AI may move the plants from a first nursery phase to a subsequent nursery phase when the plant configuration reaches a predetermined density. Alternatively, the AI may control a robotic or mechanical tray which expands in order to decrease plant density. In another exemplary embodiment, the AI may control a germination robot configured to plant seeds and seedlings in the germination phase. In some further exemplary embodiments, the plants may be transplanted to trays having varying densities of plant sites. For example, plants may be transplanted to trays having a less dense arrangement of plant sites as the plant size increases.

The AI may implement computer vision and/or other sensors to analyze plants in the various phases. In or after the greenhouse phase, the AI may control or operate a robotic system for harvesting the plants from the greenhouse(s) they are disposed in in the greenhouse phase. Thus, it may be contemplated that an exemplary embodiment is fully autonomous. In a fully autonomous exemplary embodiment, seedlings may be planted in a germination phase by a robot, and then may be moved to each of the subsequent phases using additional robotics which are autonomously controlled by the AI.

A further embodiment may harvest and prepare the plants for shipping using the robotics and AI. It may be contemplated that the AI is configured to receive instructions from an external machine, such as a web server, and to then operate the robotics to plant the seeds or seedlings based on the received instructions. The instructions may include a plant type and quantity, a desired size, a desired age, and a shipping address, for example. The AI system may then plant and grow one or more plants according to the instructions.

In an exemplary embodiment, an AI control unit may control all the systems, from the germination phase to harvest, based on the received instructions, without human intervention. The AI may identify optimal times for transporting or transplanting the plants to the different phases based on plant type, sensor data, historical data, or any other contemplated information. In a final step, the AI system may harvest the plants from the final greenhouse phase and may place the harvested plants into a distribution or shipping package. The shipping package may include shipping information related to the user who placed the order on the web server corresponding to the instructions. Thus, an exemplary embodiment may be fully implemented by an autonomous AI system which can control one or more robots to move and/or harvest the plants and one or more control systems to optimize the plant conditions/parameters.

In an exemplary embodiment, the greenhouse may implement robotics in order to harvest. A robotic arm may move hydroponic plant vessels via transport channels in the final hydroponic system seeding phase and the final hydroponic system harvest phase. The robotic arm may be integrated or controlled by the control unit. The control unit may detect that a plant is ready for harvest based on size data collected from the LIDAR and may then direct a robotic arm to harvest said plant. In a further embodiment, the control unit may be integrated with a sales or harvest schedule in order to pull hydroponic plant vessels from the final hydroponic system and package the product accordingly. For example, the robotic arm may harvest and package a specified number of plants together based on a scheduled sale.

In another exemplary embodiment, a robotic arm may harvest individual plants. The individual plants may be packaged for individual sale. For example, robotic fingers may harvest a plant into a cup or other package, where the plant may be sold as a potted plant.

Figure 5A:
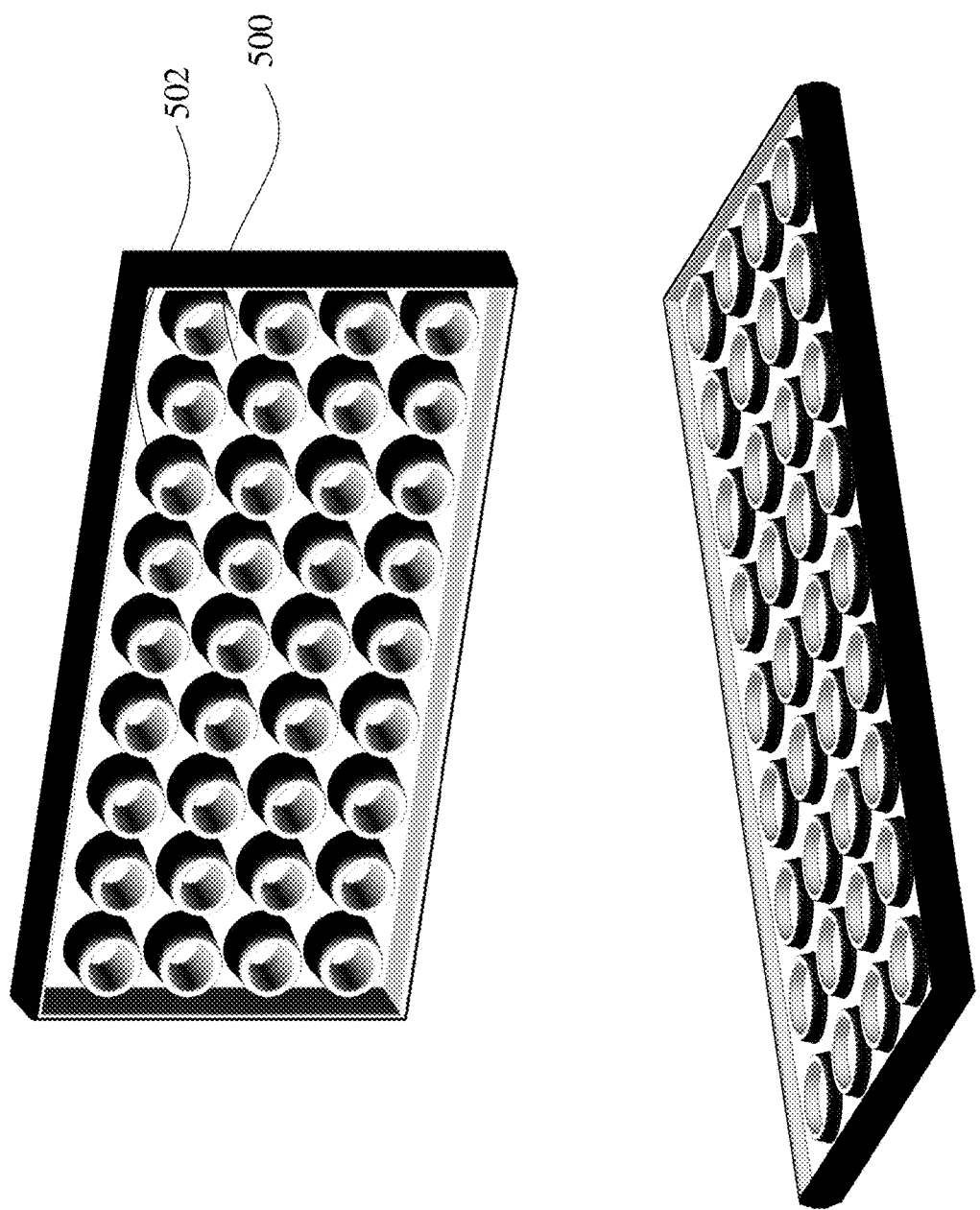
FIG. 5A is an exemplary embodiment of a nursery tray.
Figure 5B:
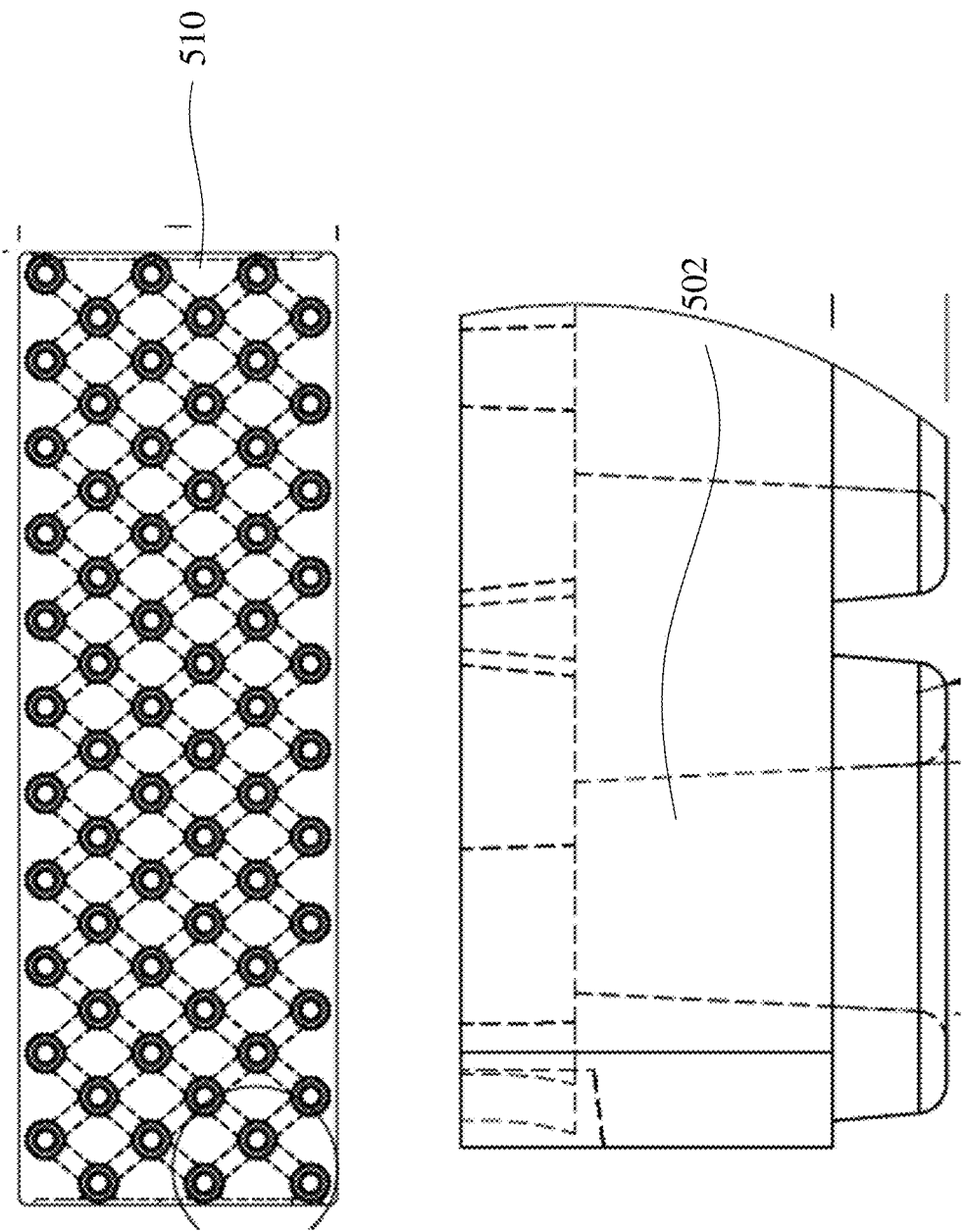
FIG. 5B is another exemplary embodiment of a greenhouse hydroponic plant vessel.

Referring now to the exemplary embodiment in FIGS. 5A-5B, FIG. 5A may show an exemplary embodiment of a nursery tray 500 and greenhouse hydroponic plant vessel 510. Plants may be placed in the hydroponic plant vessel at plant sites 502. The size of the raft may vary depending on the application. It may be contemplated that a hydroponic plant vessel is more or less dense.

Figure 6:
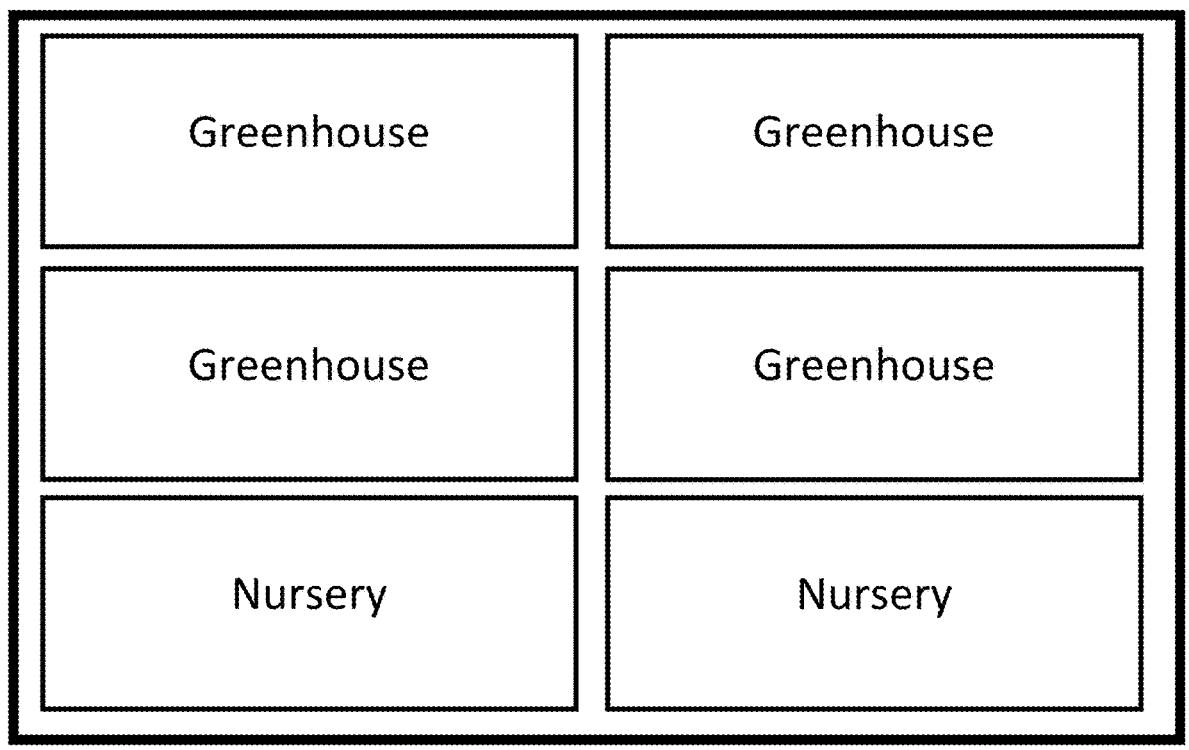
FIG. 6 is an exemplary layout of a farming facility.

Referring now to the exemplary embodiment in FIG. 6, FIG. 6 may show an exemplary layout of a farming facility. As shown in FIG. 6, multiple greenhouses (or nurseries) may be partitioned in one large facility. Such partitioning may allow for multiple different crops to grow in individualized environments. Further, the partitioning prevents the spread of pests, virus or disease throughout the entire facility. Instead, a breakout in one section may be contained. Additionally, the partitioned design may allow for a modular expansion of the facility. Additional sections can be easily integrated and expanded. The segmented nature of the facilities may allow maximum flexibility to switch between various crops. The greenhouse and nursery combination may allow for the facility to achieve an optimal combination of natural and artificial light. An AI system may identify a type of each crop and then may individually optimize the crops based on the type. The partitioning allows the AI system to optimize individual crops which may be planted next to or near plants of other types.

Each greenhouse environment shown in FIG. 6 may be individually controlled and automated. Automated seeding lines and high-efficiency germination chambers may be implemented along with nurseries. The center transport channel may efficiently move product from greenhouses into harvesting and packaging. It may be contemplated that an automated system uses the transport channels as harvesting and production lines. An exemplary AI system may utilize the transport channels within the facility for moving plants between phases. Portions of the facility may be kept cooler for packaged goods. It may be further contemplated that a dedicated nursery building may be expanded into the warehouse.

Figure 7A:
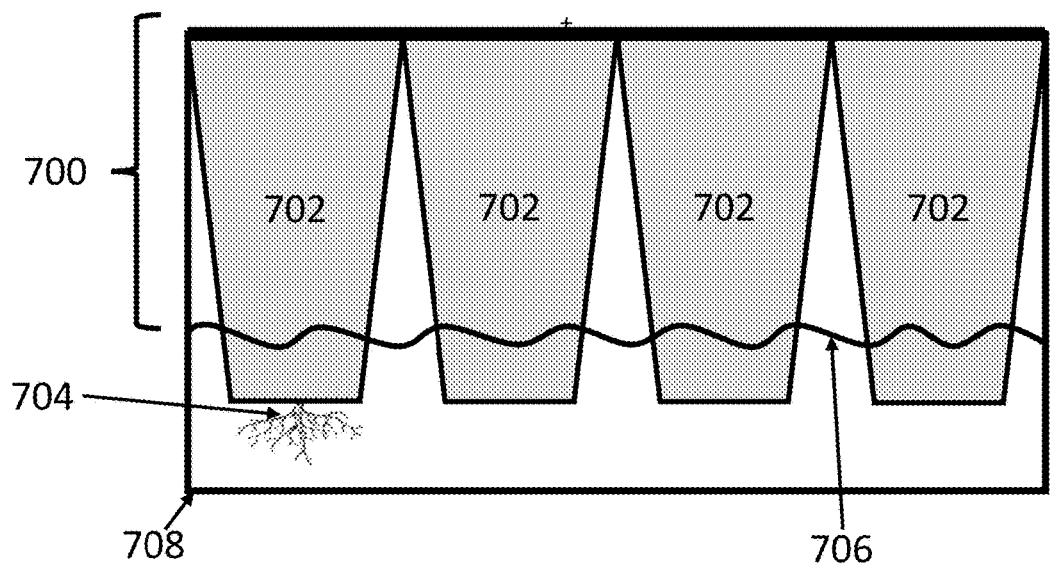
FIG. 7A is an exemplary embodiment of a plant tray.
Figure 7B:
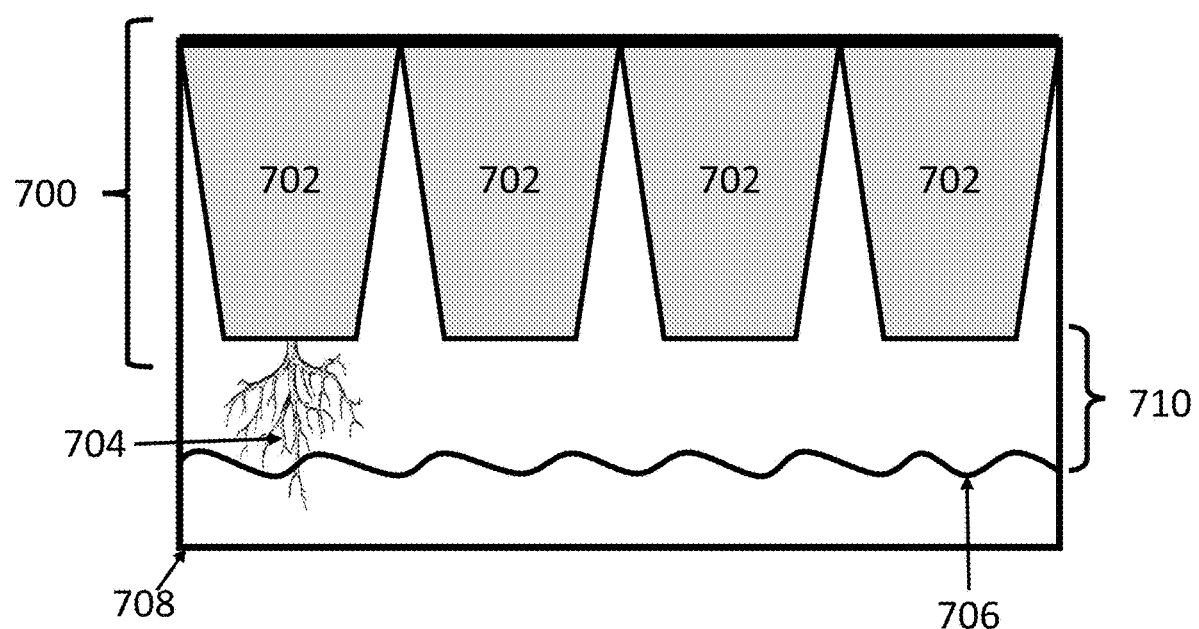
FIG. 7B is an exemplary embodiment of a plant tray spaced away from water.

Referring now to FIGS. 7A and 7B, FIGS. 7A and 7B may illustrate an exemplary plant tray placed in water. The tray 700 may include more than one pod 702 which can hold a plant. The plant roots 704 may extend out of an opening on a bottom portion of each pod 702. The tray may be placed on a table or in a container 708 which holds water 706. As shown in FIG. 7A, the water level 706 may reach the plant roots 704. Then, as shown in FIG. 7B, the water level 706 may be reduced, creating a larger gap 710. The gap 710 may facilitate the root growth by encouraging roots to grow directly downwards, since roots may naturally grow towards their source of water. By creating gap 710, the root length may be optimized allowing plants to absorb more nutrients through the larger surface area of the roots. Plants with optimized roots have a larger surface area contacting the nutrient solution and accordingly have an improved ability to take in nutrients, and can therefore grow faster. For example, an exemplary embodiment may optimize the root length as shown in FIGS. 7A and 7B in a nursery phase, thus allowing the optimized plants to develop quicker in the subsequent greenhouse phase.

An AI or machine learning system may simulate trials to identify and model the lifecycle of a plant. Data may include, for example, plant specific data, such as total mass, leaf size, color, health, pest infestation, or root size. History tracked by duration in each cycle or phase may be tracked and compared to expected values. Data may also include growing history data, such as total light received (DLI), nutrients consumed, or $CO_2$ consumed, for example. This may also implement tracking data within the greenhouses. The data models of each plant may be formed or identified by, for example, monitoring each plant throughout the lifecycle of the plant. An index of each plant may thus be formed by modeling multiple plants as they grow. The indexing of plants may allow for the identification of optimal parameters for plant growth. In an exemplary embodiment, environmental parameters may refer to any parameters related to the plant, including any parameters which may be controlled by the control unit. Plant parameters may refer to the various parameters or criterion relating to and/or measured from the plant itself, including plant size, root length/surface area, weight, mold, DLI, and any other contemplated measured metric. Operational parameters may refer to, for example, annual yield of the plants, capital expenses required for the plants, operational expenses associated with the plants, or energy usage/cost required to plant and harvest the plants.

Figure 8:
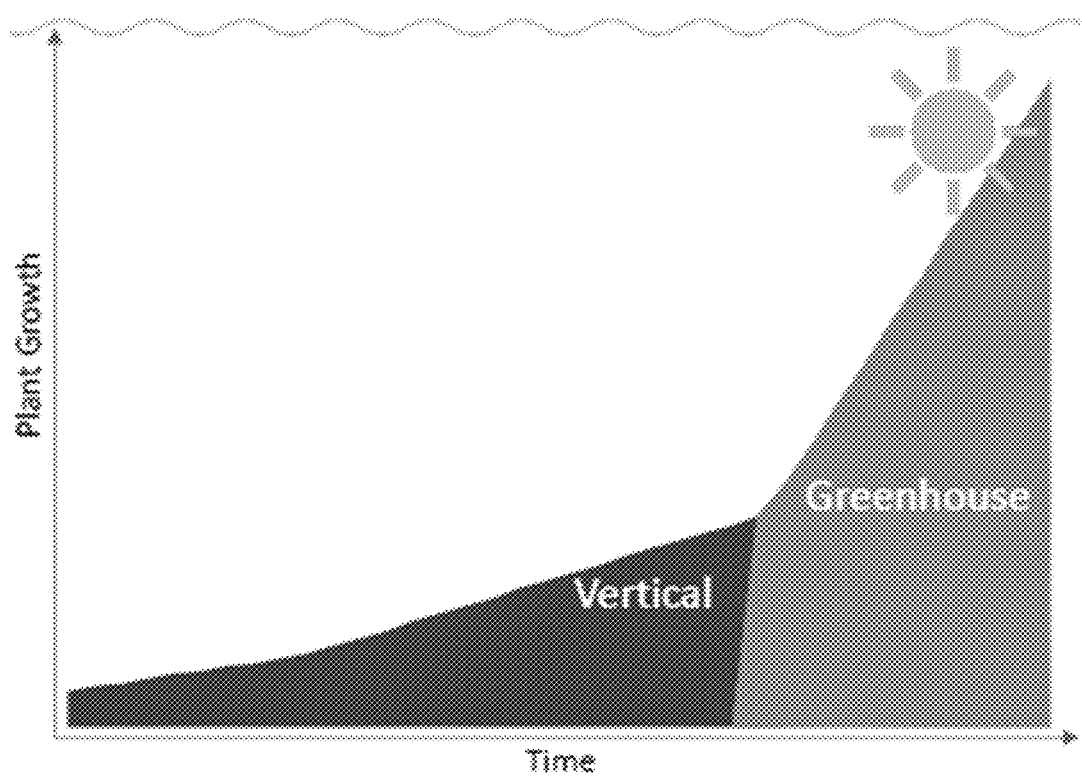
FIG. 8 is an exemplary graphical chart illustrating plant growth over time and place in an exemplary embodiment.

Referring now to the exemplary graph in FIG. 8, FIG. 8 may show plant growth over time in an exemplary embodiment. In the first vertical section, the plants may be in the germination and nursery phases, where the plants may be kept in vertical arrangements. Then, the plants may be brought to the greenhouse or final hydroponic stage which may allow growth at a higher rate. The greenhouse stage may or may not employ vertical arrangements and may optionally receive natural light in addition to or instead of artificial light. As shown in FIG. 8, the initial rate of plant growth in the vertical phase may be slower than the rate of growth in the greenhouse phase. Thus, efficiency may be increased by placing a large number of plants in the nursery phases, where their roots can develop, and transplanting some of them into a less dense and quicker greenhouse phase, where the roots are in the nutrient rich solution on day 1, for the final period of growth.

According to an exemplary embodiment, a transplanter may be used to transfer plants from an initial platform or substrate to a tray. The tray may be optimized for a specific plant varietal and to promote root development. Adjustments may include plant spacing and orientation to the nutrient rich water. The transplanter may be controlled by a human operator or by an AI control unit. The AI may identify optimal times for transferring plants, and may activate the transplanter at those times.

According to an exemplary embodiment, a greenhouse may be laid out traditionally (as opposed to vertically) in order to allow for natural sunlight to reach the plants (which may potentially be augmented by artificial light), as well as the plant roots to be in direct contact with the deep-water culture, thus promoting faster growth. In some embodiments, different varieties of plants may be planted in the same greenhouse. When transplanted to the greenhouse, it may be contemplated that the plants are spread out in anticipation of them reaching a desired size. An AI may optimize the density of plants in the greenhouse.

Figure 9A:
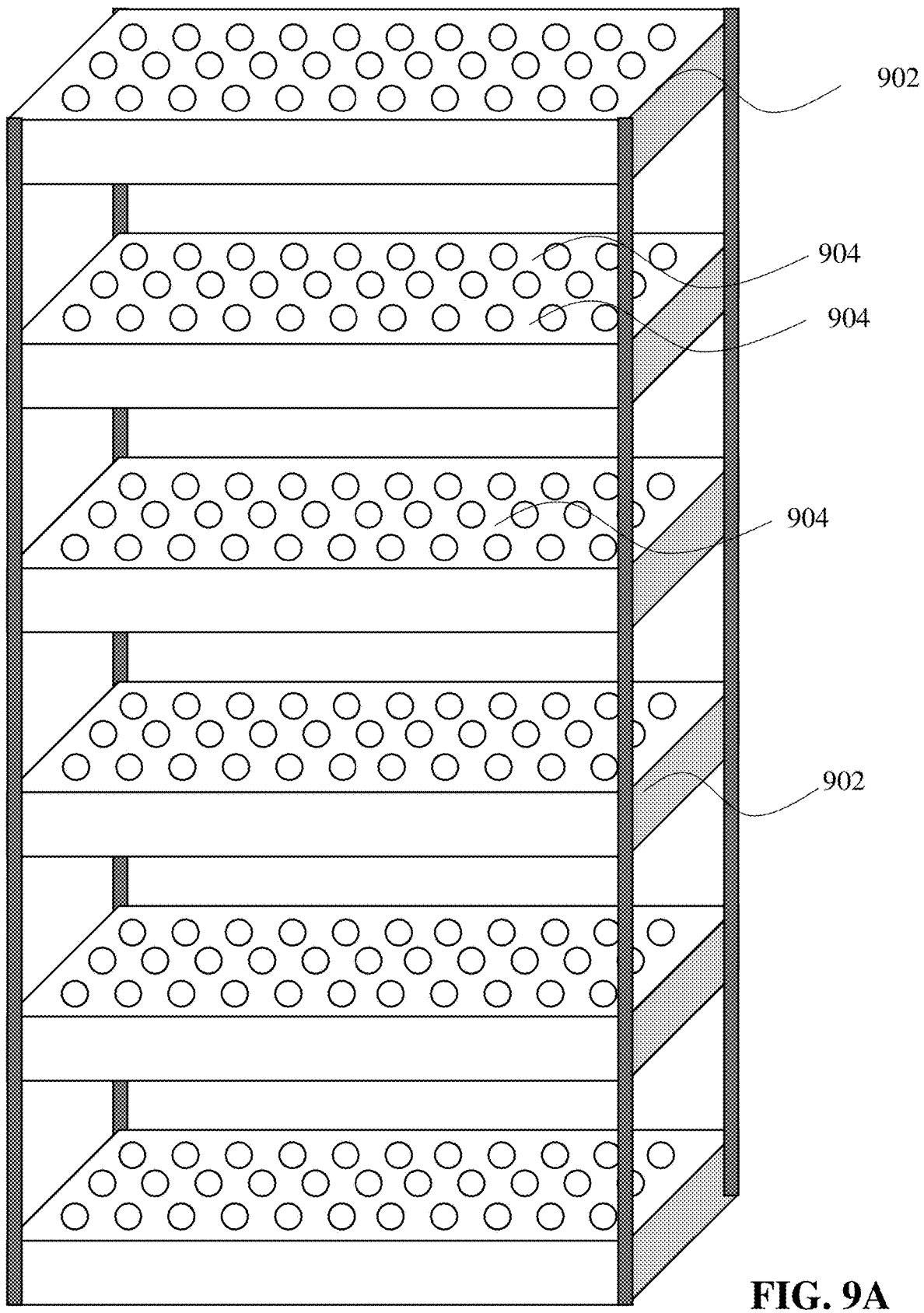
FIG. 9A is an exemplary embodiment of a vertical farming arrangement.
Figure 9B:
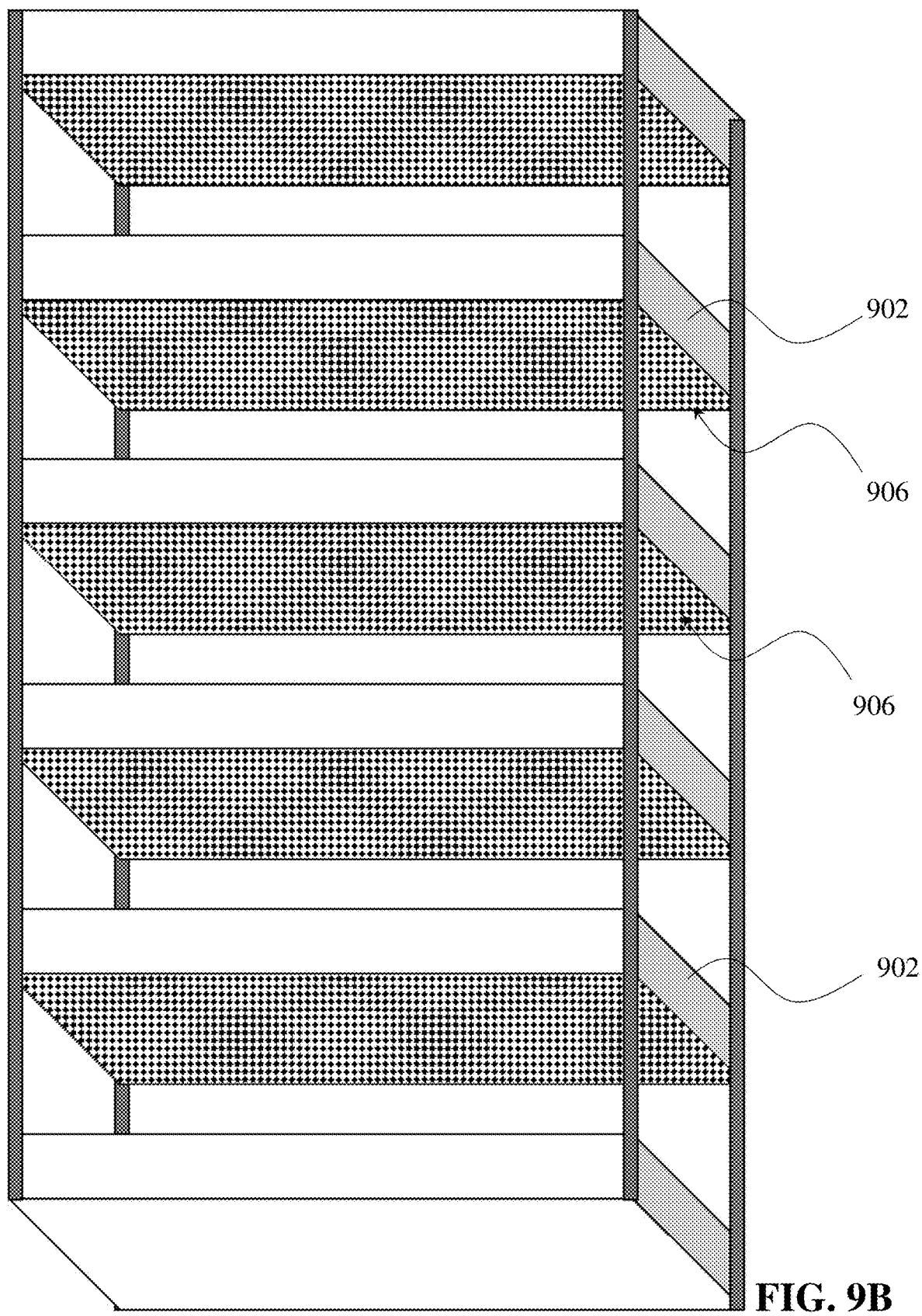
FIG. 9B is an exemplary embodiment of a vertical farming arrangement.

Now referring to exemplary FIG. 9A-9B, an exemplary vertical arrangement for a nursery phase may be shown. A vertical hydroponic arrangement 900 may have a series of shelves 902, which may support plants 904. Shelves 902 may also have light sources 906 disposed on an under-side to irradiate plants below. The light sources may be light emitting diodes (LED). The shelves may further incorporate systems for transporting nutrients and water into each of the shelves 902. Further, an exemplary embodiment may include a grip or handle which is used by a transplanter or other robotic element for moving the shelves or for moving plants within the shelves. It may be contemplated that the control unit autonomously changes the water level or watering method based on the environmental parameters, historical data, or the like.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for farming plants, comprising:
   planting a plurality of plants in one or more trays, and placing the trays in a nursery;
   in the nursery, placing each tray above a surface of water, wherein a root zone substrate of each of the plants contacts the water during initial placement;
   transplanting the plants to a modified planting tray, wherein in the modified planting tray the root zone substrate is suspended over the water;
   encapsulating a plurality of roots in the root zone substrate in a protected chamber, wherein the protected chamber comprises a microclimate and is configured to guide root growth outside of the root zone substrate, and wherein the roots inside the protected chamber are protected from air pruning;
   after placing the trays above water, and after a plurality of roots begin to develop from the root zone substrate, separating the root zone substrate from the water, creating a gap between the root zone substrate and the water, wherein the root zone substrate is still at least partially or periodically submerged in the water after separating the root zone substrate from the water;
   monitoring a size of the roots of the plants, and continuously reducing a water level to increase the gap as the roots grow;
   after the roots reach a predetermined size, moving the plants to a greenhouse where the roots of the plants are directly submerged in a stream or body of water.

2. The method for farming plants of claim 1, wherein the plants are arranged in a vertical farm in the nursery and in a horizontal farm in the greenhouse.

3. The method for farming plants of claim 1, wherein the plants in the greenhouse receive lighting from at least natural sunlight.

4. The method for farming plants of claim 1, wherein the trays further comprise an open bottom, such that the roots can grow in a direction towards the water without obstruction.

5. The method for farming plants of claim 1, further comprising
   storing plant historical data comprising the monitored size of the roots along with a plant growth time and
   identifying an optimal time to move the plants from the nursery to the greenhouse based on the plant historical data.

6. The method for farming plants of claim 1, wherein the plants are placed in one or more rafts immediately prior to the greenhouse, and the rafts are placed in the greenhouse.

7. The method for farming plants of claim 1, wherein the nursery phase comprises a nutrient film technique, ebb and flow, or deep-water culture.

8. The method for farming plants of claim 1, further comprising at least one additional nursery phase, wherein the additional nursery phase comprises a different watering system than the nursery.

9. The method for farming plants of claim 1, further comprising monitoring plant size; identifying an optimized plant density based on the plant size; and arranging the plurality of plants according to the optimized plant density.

10. The method for farming plants of claim 1, wherein the nursery comprises a first nursery phase and a second nursery phase, and wherein the first nursery phase comprises an ebb and flow watering technique and the second nursery phase comprises a nutrient film technique.

11. The method for farming plants of claim 1, further comprising harvesting the plants.

12. The method for farming plants of claim 1, further comprising at least one additional nursery, wherein the trays are modified in the at least one additional nursery to remove a bottom portion of the tray such that the plant plugs directly face and contact the water, and such that the roots grow towards the water unobstructed.

\* \* \* \* \*